R. DUNBAR.

PORTABLE ELEVATOR.

No. 10,521. Reissued Sept. 16, 1884.

Witnesses.

A. J. Langster

J. W. Caldwell.

Inventor.

Robert Dunbar

By James Langster atty.

UNITED STATES PATENT OFFICE.

ROBERT DUNBAR, OF BUFFALO, NEW YORK.

PORTABLE ELEVATOR.

SPECIFICATION forming part of Reissued Letters Patent No. 10,521, dated September 16, 1884.

Original No. 264,938, dated September 26, 1882. Application for reissue filed October 20, 1883.

*To all whom it may concern:*

Be it known that I, ROBERT DUNBAR, a citizen of the United States, residing in Buffalo, in the county of Erie and State of New York, have invented certain new and useful Improvements in Portable Elevators, of which the following is a specification.

The object of my invention is to produce a portable elevator or elevator-tower capable of being conveniently and quickly moved from place to place, so as to reach the different hatches of a vessel without the necessity of moving the same, thereby obtaining the advantage of less dockage and affording the means whereby two elevators may be operated in the same vessel at the same time, so that a stationary elevator may be used in one hatch, while the movable elevator may be adjusted to operate in another hatch, all of which will be fully and clearly hereinafter shown by reference to the accompanying drawings, in which—

Figure 1:
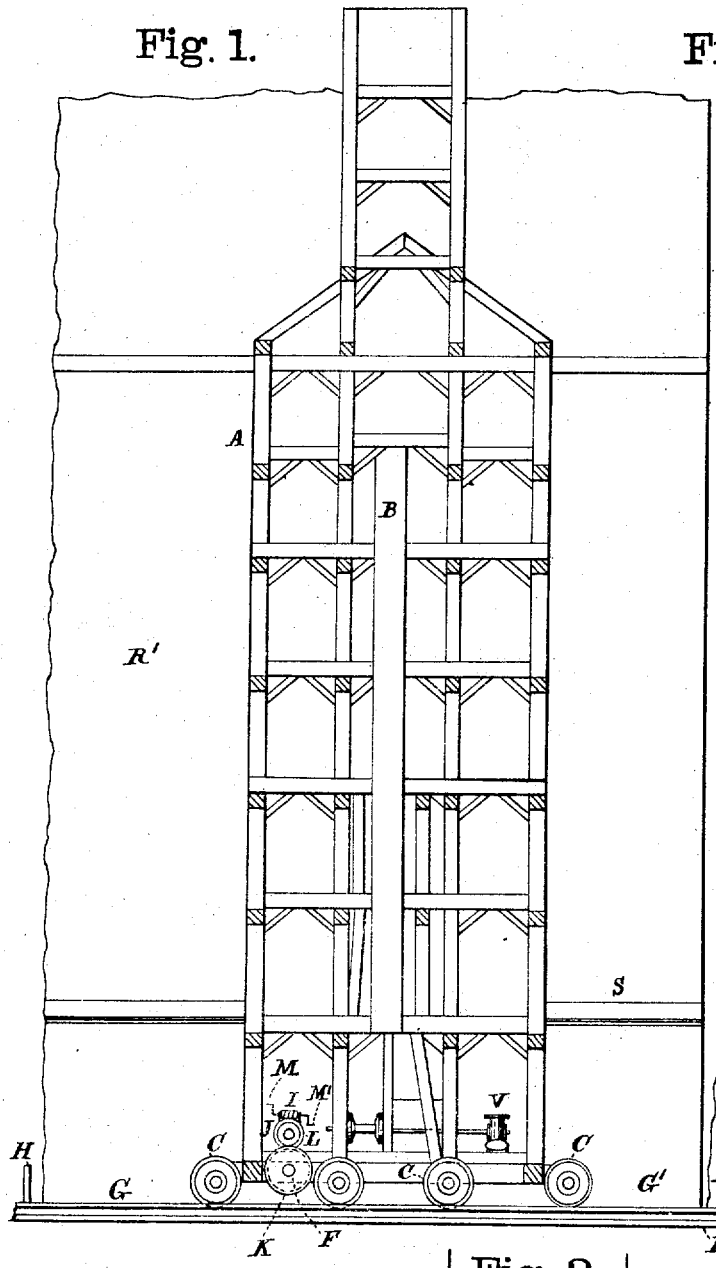
Figure 2:
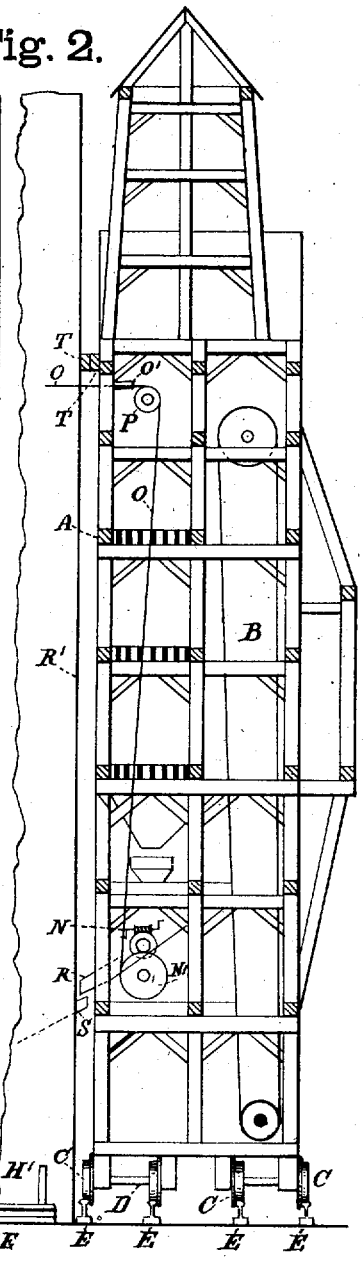
Figure 3:
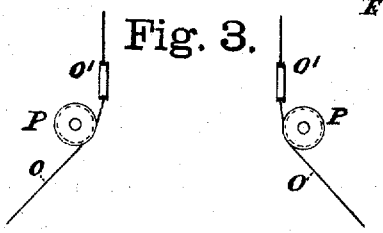

Figure 1 is a front sectional elevation; Fig. 2, a side sectional elevation, and Fig. 3 is a diagram showing a top view of the arrangement of the cables and pulleys for holding the building secure at any point to which it may be moved.

A represents an elevator or elevator-tower; B, the usual elevator-leg, which is supplied with the usual buckets, an engine, and other connections for operating the same, all of which may be constructed and arranged in the ordinary way, so that no further description of this part of the apparatus is required here. The elevator-tower is supported on flanged wheels C, rigidly secured to shafts D.

E represents a series of parallel rails, made, preferably, of railroad-iron.

F is a drum having a cable or chain, G G′, secured thereto and rigidly fastened to two parts, H H′, so that one will wind around the drum and the other unwind as the drum turns.

I J represent an endless screw and a worm wheel, which operates the drum F by means of the spur-wheel K and pinion L.

M M′ represent two cranks, by which the device is operated. (See Fig. 1.) This arrangement gives the power required to move so large an apparatus.

N is an endless screw and worm gear, similar to that just described, (see Fig. 2,) of which there are two, (one on each side of the elevator,) for operating the drums N′. To each of the said drums N′ are connected the cables O, which pass over the grooved pulleys O′ and against the pulleys P, (see Figs. 2 and 3,) so that the tower may be connected either to the main building or elevator or to any other point of support. The object of this part of the apparatus is to securely hold the elevator-tower in its proper position when adjusted to the required point along the front of the main building, and hold it laterally and from being drawn forward by the weight or action of the elevator-leg and its connections, which are on the opposite side of the elevator.

The railroad-tracks E are arranged in parallel lines along the whole length of the main elevator.

R represents a spout for transferring the grain from the tower to the main elevator.

The line R′ represents a portion of the main stationary elevator. It is provided with a beam, T, arranged horizontally along its whole length. The elevator-tower is also provided with a similar beam, so that when the two are drawn together by the cables O they will face each other, as shown in Fig. 2, and the two buildings will thereby be held firmly together.

On the main stationary elevator is a long trough, S, extending horizontally along its whole length, so as to receive the grain from the spout R from any point to which the elevator-tower may be adjusted.

V represents a suitable engine, arranged on the lower floor of the elevator-tower, so as to prevent the shaking or trembling of the upper floors, where the weighing of the grain is done.

The operation of the invention will be readily understood from the drawings and foregoing description. By operating the drum F, as before mentioned, it will cause the elevator to be drawn either to one side or the other, according to the direction in which said drum may be turned, after which it is firmly secured to the main building, as before mentioned.

I claim as my invention—

1. In an elevator-tower, the combination of the mechanism, substantially as described, for moving it horizontally back and forth, with the gearing N, drums N′, and cables O, for securing it at any point to which it may be moved.

2. A movable and adjustable elevator-tower arranged upon wheels, and provided with the cables O, gearing and drums or pulleys N N′, and a grain-spout, R, in combination with a main stationary elevator-building, R′, having a long horizontally-arranged trough, S, to receive the grain from any point to which the elevator-tower may be adjusted.

3. The combination of the main stationary elevator, and the movable elevator-tower A, having wheels adapted to tracks in front of the main building, substantially as specified, whereby two elevators may be operated at the same time, so that a stationary elevator may be used in one hatch, while the movable elevator may be adjusted to operate in another hatch, substantially as specified.

4. The combination of a movable elevator-tower, having wheels adapted to tracks, with a rope or chain, G G′, anchored at both ends, and passing around a drum or pulley, and with gearing through the medium of which the said drum may be rotated, substantially as set forth.

5. The combination of the stationary elevator R′, a movable elevator-tower, ropes or cables connecting the two, and mechanism as shown, whereby said ropes may be tightened and loosened, all substantially as described.

ROBT. DUNBAR.

Witnesses:
J. M. CALDWELL,
JAMES SANGSTER.